United States Patent Office 3,492,088
Patented Jan. 27, 1970

---

3,492,088
METHOD OF PREPARING AN ACID-ACTING CRYSTALLINE ALUMINOSILICATE CATALYST
Robert A. Hildebrandt, Arlington Heights, Ill., assignor to Universal Oil Products Company, Des Plaines, Ill., a corporation of Delaware
No Drawing. Filed Dec. 28, 1967, Ser. No. 694,093
Int. Cl. C01b *33/28;* B01j *11/40*
U.S. Cl. 23—111                                 10 Claims

ABSTRACT OF THE DISCLOSURE

A method of preparing an acid-acting crystalline aluminosilicate characterized by thermally stable acid sites. The sodium form of the crystalline aluminosilicate is ion-exchanged with an acid or acidic salt in alcoholic solution and heat-treated at about 800° C.

BACKGROUND OF THE INVENTION

The crystalline aluminosilicates, often referred to as zeolites or molecular sieves, have become increasingly important in recent years. The crystalline aluminosilicates have been shown to possess unusual catalytic activity, especially with respect to the so-called acid catalyzed reactions. Crystalline aluminosilicates may be pictured as built up of tetrahedras, each comprising oxygen atoms disposed at the vertices thereof with either a silicon or aluminum atom at its center. A silicon atom with a +4 valence is connected to one of the two valence bonds of each of the four oxygen atoms in the tetrahedral configuration. The other valence bond of the oxygen atom is linked to a neighboring silicon or aluminum atom. Thus, the structure may be thought of as a series of silicon and aluminum centered tetrahedra arranged in an orderly manner and cross-linked by the common sharing of oxygen atoms in three dimensions resulting in an overall ratio of O/(Al+Si) of 2. Because of the orderly arrangement of the tetrahedra, uniform pores are created and the material will diffract and focus X-ray beams to give a distinct diffraction pattern. There are many types of crystalline aluminosilicates including faujasite, chabazite, mordenite, and the like. The differences in the various types stems from the particular arrangement of the tetrahedra. A given type exhibits a fixed X-ray diffraction pattern and thus X-ray diffraction is commonly employed to distinguish the various types.

The aluminum centered tetrahedra possess unusual properties since aluminum has a +3 valence and yet is associated with 1 valence bond from each of 4 oxygen atoms. The resulting electrical imbalance is resolved by the association of a cation with the aluminum centered tetrahedra. For example, one sodium cation having a valence of +1 associates itself with each aluminum centered tetrahedra. These crystalline aluminosilicates occur or are initially prepared in the sodium form and have a mole formula $Na_2O:Al_2O_3:xSiO_2:yH_2O$ where $x$ and $y$ are varying numbers. The sodium form of the crystalline aluminosilicates possess little if any acid activity and are not considered suitable as catalysts. However, the sodium cations associated with the aluminum centered tetrahedra may be replaced with other cations by a simple ion-exchange. For example, a substantial portion of the sodium cations are replaced with ammonium ions by soaking the crystalline aluminosilicate in an ammonium salt solution. Since the ammonium cation has a +1 valence, one ammonium cation will satisfy 1 aluminum centered tetrahedra. The ion-exchange is followed by thermal treatment whereby ammonia is evolevd leaving the hydrogen form of the aluminosilicate possessing the desired acid sites determinative of catalyst activity.

It has been observed that the acid-acting crystalline aluminosilicates thus prepared suitably retain their acid character at temperatures up to about 600° C. However, at higher temperatures the acid sites which contribute so favorably to catalytic activity become unstable and the acid function of the crystalline aluminosilicate falls off drastically. It is an object of this invention to present a method of preparing an acid-acting crystalline aluminosilicate catalyst characterized by thermally stable acid sites.

SUMMARY OF THE INVENTION

In one of its broad aspects, this invention embodies a method of preparing an acid-acting crystalline aluminosilicate catalyst characterized by thermally stable acid sites which comprises ion-exchanging a crystalline alkali metal aluminosilicate with an alcoholic ion-exchange solution comprising a soluble compound selected from the group consisting of an acid and an acidic salt.

Another embodiment relates to a method of preparing an acid-acting faujasite catalyst characterized by thermally stable acid sites, and comprises ion-exchanging a faujasite having a composition expressed in terms of oxide mole ratios as follows:

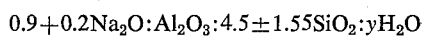
$$0.9 + 0.2Na_2O : Al_2O_3 : 4.5 \pm 1.55SiO_2 : yH_2O$$

where $y$ is a number up to about 8, with an alcoholic ion-exchange solution comprising a soluble acidic salt.

A more specific embodiment is in a method of preparing an acid-acting faujasite catalyst characterized by thermally stable acid sites, and comprises ion-exchanging a faujasite with a methanolic solution of ammonium acetate.

Other objects and embodiments of this invention will become apparent in the following detailed specification.

In accordance with the method of this invention, a crystalline alkali metal aluminosilicate is ion-exchanged in alcoholic media. Of the various crystalline aluminosilicates, e.g., faujasite, mordenite, etc., faujasite has found the broadest application with respect to the so-called acid catalyzed reactions. The method of the present invention will therefore be of particular interest in the preparation of acid-acting faujasite catalysts. However, it is understood that the method is suitably employed in the manufacture of acid-acting crystalline aluminosilicates in general to establish thermally stable acid sites thereon.

The crystalline alkali metal aluminosilicate, usually the sodium form, treated in accordance with the method of this invention, can be a naturally occurring material. However, a synthetically prepared material is generally preferred. The faujasite herein contemplated has been defined in the literature and does not warrant an extensive description herein. Briefly, faujasite is characterized by pore openings in the range of from about 6 to about 15 angstroms. The faujasites can be represented in terms of mole ratios of oxides in the following manner:

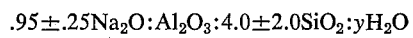
$$.95 \pm .25Na_2O : Al_2O_3 : 4.0 \pm 2.0SiO_2 : yH_2O$$

wherein $y$ is a number of up to about 8. Faujasites characterized by a silica-alumina ratio of at least about 3 are usually preferred, for example, a faujasite represented in terms of mole ratios of oxides as follows:

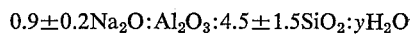
$$0.9 \pm 0.2Na_2O : Al_2O_3 : 4.5 \pm 1.5SiO_2 : yH_2O$$

The synthetic crystalline aluminosilicates are commercially available, or they may be prepared in any conventional or otherwise convenient manner. For example, one preferred method of preparation comprising forming an aqueous solution of sodium aluminate and sodium hydroxide in a reactive amorphous silica. Suitably, the amorphous silica reactant may be fume silica, chemically precipitated silica, a precipitated silica sol, and such silicas as are described by the trade names "Hi-Sil," "Cab-O-Sil,"

and the like. The resulting reaction mixture preferably comprises a molar ratio of $Na_2O$ to $SiO_2$ of at least about 0.3 and generally not in excess of about 0.8. Sodium aluminate comprising a molar ratio of $Na_2O$ to $Al_2O_3$ of about 1.5 is suitably employed as a reactant. The selected silica source and the sodium aluminate solution are employed in amounts such that the mole ratio of silica to alumina in the reaction mixture is from about 6 to about 20. Thus, the reaction mixture preferably has a composition which may be expressed as a mixture of oxides as follows: $SiO_2$ to $Al_2O_3$ in a molar ratio of from about 6 to about 20, $Na_2O$ to $SiO_2$ in a molar ratio of from about 0.3 to about 0.8 and $H_2O$ to $Na_2O$ in a molar ratio of from about 35 to about 60. In any case, the reaction mixture is heated, usually at a temperature of about 212° F., in a closed vessel to avoid water loss. A crystalline aluminosilicate reaction product which precipitates from the hot reaction mixture is separated and water washed until the water in equilibrium with the crystals attains a pH of from about 9 to about 12.

Pursuant to the method of this invention, the crystalline alkali metal aluminosilicate is ion-exchanged with an acid and/or acidic salt in alcoholic solution. The alcohol employed is preferably a lower molecular weight alcohol containing up to about 3 carbon atoms, e.g., methyl alcohol, ethyl alcohol, propyl alcohol and isopropyl alcohol.

The concentration of the ion-exchange solution will vary as determined by the nature of the particular compound used, the crystalline alkali metal aluminosilicate to be treated, and the conditions at which the treatment is effected. Generally, it is desirable to carry out the ion-exchange treatment at conditions to reduce the alkali metal content of the crystalline aluminosilicate to less than about 1 weight percent thereof. This may be accomplished by one ion-exchange treatment although successive treatments are usually employed. Ion-exchange in alcoholic solution has been found to be substantially more efficient to replace alkali metal cations than is the case with a corresponding aqueous solution.

The temperature at which ion-exchange is effected may vary widely. Generally, the ion-exchange is suitably effected at about room temperature although the ion-exchange rate may be accelerated with temperature. Thus, when so desired, a temperature approaching the boiling point of the alcohol employed may be utilized. The ion-exchange solution is usually utilized in excess, with the excess being separated after an optimum period of contact with the crystalline aluminosilicate to be recovered for recycle if so required. The time of contact in any instance, as well as the number of treatments, will be determined in part by the level to which it is desired to reduce the alkali metal content of the crystalline aluminosilicate—usually to less than about 1 weight percent thereof as previously mentioned. It will be appreciated that the optimum contact time will vary depending upon the temperature of the ion-exchange solution, nature of the crystalline aluminosilicate, and the particular compound selected to accomplish the ion-exchange. Thus, the contact time may extend from a relatively brief period of from about 0.5 hour to a period of about 24 hours.

A wide variety of acidic compounds heretofore disclosed to effect ion-exchange of crystalline alkali metal aluminosilicates can be employed in accordance with the method of this invention provided that they are alcohol soluble. Suitable acidic compounds thus include both inorganic and organic acids and also acidic salts which promote the formation of Brönsted acid sites on the crystalline aluminosilicate as herein contemplated. Sulfuric acid, nitric acid, hydrochloric acid, etc., are representative of inorganic acids which may be employed, and such acids are utilized in very dilute alcoholic solution. Also organic acids, particularly aliphatic monocarboxylic acids like formic acid, acetic acid, propionic acid, butyric acid, and others heretofore disclosed, can be utilized. Suitable acidic salts particularly include the ammonium salts generally employed as hydrogen ion precursors, such salts including ammonium sulfate, ammonium nitrate, ammonium chloride, ammonium bromide, ammonium iodide, ammonium formate, ammonium acetate, etc. Other acidic salts such as aluminum nitrate, aluminum chloride, aluminum sulfate, aluminum acetate, etc., which promote the formation of Brönsted acid sites, are also suitable.

The ion-exchanged product recovered from the treating solution is water-washed to remove soluble matter including anions introduced as a result of the ion-exchange process. The washed product is then dried, generally in air. While drying may be accomplished at ambient temperature, it is more satisfactorily accomplished at an elevated temperature, suitably a temperature of from about 50° C. to about 250° C.

The dried material is thereafter subjected to an activating treatment whereby thermally stable acid sites are established on the crystalline aluminosilicate. Such treatment entails treating the crystalline aluminosilicate at a temperature of from about 700° C. to about 900° C., preferably at a temperature of from about 750° C. to about 850° C. in an air atmosphere. The thermally stable acid sites are suitably established upon exposure to said temperature for a period of at least about 1 hour, and usually a period of from about 1 to about 24 hours.

By conventional ion-exchange methods utilizing an aqueous ion-exchange solution, it is the practice to exchange the alkali metal cations of the crystalline aluminosilicate with hydrogen ions either directly as with a dilute acid solution, or indirectly, as with an ammonium ion solution. In the latter case, the ammonium ion exchanged crystalline aluminosilicate is thermally treated whereby ammonia is evolved and hydrogen protons retained to establish the desired hydrogen form of the crystalline aluminosilicate. In any case, the acid sites formed on the crystalline aluminosilicate are characterized as Brönsted acid sites and are considered essential to certain of the acid catalyzed reactions, in particular, the catalytic cracking of hydrocarbon feed stocks. In contrast to the acid sites established pursuant to the method of this invention, the acid sites thus established tend to deteriorate at temperatures in excess of about 600° C. and the acid function of the crystalline aluminosilicate falls off drastically. By the present method of ion-exchange, the Brönsted acid sites are more firmly established on the crystalline aluminosilicate and, upon subsequent thermal treatment, form strong, thermally stable acid sites which will effectively catalyze high temperature acid catalyzed reactions.

The following examples are presented in illustration of the method of this invention and are not intended as an undue limitation on the generally broad scope thereof as set out in the appended claims.

EXAMPLE I

Twenty-five grams of a crystalline aluminosilicate, commonly described as the sodium form of the Y type faujasite, was ion-exchanged in contact with a 30 weight percent aqueous ammonium acetate solution. The ion-exchange was effected in three stages at contact times of 0.5, 0.5, and 1.5 hours respectively. Treatment in each case was at 50° C. and with a fresh ion-exchange solution. The ion-exchanged faujasite was water-washed and dried at 110° C. for 2 hours. The dried faujasite was thereafter calcined in air at 800° C. for 2 hours, cooled to room temperature and evaluated as hereinafter described.

EXAMPLE II

An ion-exchanged faujasite was prepared in substantially the same manner as described in the previous example with the exception that the faujasite was ion-exchanged in contact with a 20 weight percent methanolic ammonium acetate solution in accordance with the method of this invention. The first exchange was at 25° C.

for three hours, the second at 25° C. for ½ hour, and the third at 50° C. for ½ hour. A sample was evaluated as described below.

The relative acidities of the above catalyst preparations was determined by the oxidation of ammonia adsorbed on the acid sites thereof. Thus, a catalyst sample was first heated under vacuum at a temperature of 800° C. for ½ hour, the pressure reaching about $10^{-5}$ millimeters. The pressure was then brought to one atmosphere with gaseous ammonia and heating was continued at 800° C. for another 5 minutes. Thereafter, the excess ammonia was evacuated and the sample further heated under vacuum at 800° C. for ½ hour.

To determine the relative acid strengths of the samples in retaining the adsorbed ammonia on the acid sites, 2% oxygen diluted in helium was passed over each sample at a temperature of 400, 650 and 800° C., the effluent stream being analyzed to determine oxygen consumption in each case. In this manner, the thermal stability of the acid sites at each of said temperatures was determined.

The catalyst preparation of Example I consumed 70 micromoles of oxygen at 400° C. and 70 micromoles at 600° C. However, at 800° C. no oxygen was consumed indicating the complete loss of strong acid sites. On the other hand, the catalyst preparation of Example II consumed 64 micromoles of oxygen at 400° C., 64 micromoles at 650° C. and 64 micromoles at 800° C. The constant oxygen consumption with varying temperatures indicates that Brönsted acidity is being measured.

I claim as my invention:

1. A method of preparing an acid-acting crystalline aluminosilicate catalyst characterized by thermally stable acid sites which comprises ion-exchanging a crystalline alkali metal aluminosilicate with an alcoholic ion-exchange solution comprising an alcohol soluble compound selected from the group consisting of an acid and an acidic salt—the alcohol containing up to about 3 carbon atoms, and heat treating the ion-exchanged product at a temperature of from about 700° C. to about 900° C.

2. The method of claim 1 further characterized in that said crystalline alkali metal aluminosilicate is a faujasite.

3. The method of claim 2 further characterized in that said faujasite has a composition expressed in terms of oxide mole ratios as follows:

$$0.9 \pm 0.2 Na_2O : Al_2O_3 : 4.5 \pm 1.5 SiO_2 : yH_2O$$

where $y$ is a number up to about 8.

4. The method of claim 3 further characterized in that said alcoholic ion-exchange solution comprises a soluble acid.

5. The method of claim 3 further characterized in that said alcoholic ion-exchange solution comprises a soluble acidic salt.

6. The method of claim 4 further characterized in that said alcoholic ion-exchange solution is a methanolic solution.

7. The method of claim 5 further characterized in that said alcoholic ion-exchange solution is a methanolic solution.

8. The method of claim 6 further characterized in that said methanolic solution comprises acetic acid.

9. The method of claim 7 further characterized in that said methanolic solution comprises amomnium acetate.

10. An acid-acting faujasite produced by the method of claim 3.

References Cited

UNITED STATES PATENTS

| 2,934,504 | 4/1960 | Talvenheimo | 252—450 |
|---|---|---|---|
| 3,375,064 | 3/1968 | Miale et al. | 23—111 |
| 3,383,169 | 5/1968 | Young | 252—455 X |
| 3,395,029 | 7/1968 | Bizzarri | 23—111 X |

DANIEL E. WYMAN, Primary Examiner

C. F. DEES, Assistant Examiner

U.S. Cl. X.R.

252—455